(12) United States Patent
He

(10) Patent No.: US 8,969,744 B2
(45) Date of Patent: Mar. 3, 2015

(54) INTELLIGENT LUNCH BOX

(75) Inventor: Guangsen He, Xi'an (CN)

(73) Assignee: Xi'an Dai Zhihong Industry and Trade Co., Ltd., Shaanxi (CN)

( * ) Notice: Subject to any disclaimer, the term of this patent is extended or adjusted under 35 U.S.C. 154(b) by 294 days.

(21) Appl. No.: 13/612,510

(22) Filed: Sep. 12, 2012

(65) Prior Publication Data

US 2013/0001109 A1    Jan. 3, 2013

Related U.S. Application Data

(63) Continuation of application No. PCT/CN2011/070492, filed on Jan. 21, 2011.

(30) Foreign Application Priority Data

Mar. 31, 2010    (CN) .......................... 2010 1 0137321

(51) Int. Cl.
*A47G 19/00*    (2006.01)
*A45C 11/20*    (2006.01)
(Continued)

(52) U.S. Cl.
CPC .............. *A47G 29/141* (2013.01); *G01G 21/28* (2013.01); *G01G 21/22* (2013.01); *G01G 19/4146* (2013.01); *A47G 19/32* (2013.01); *A45C 11/20* (2013.01); *A45C 15/00* (2013.01); *A45C 2013/026* (2013.01)
USPC ....................................... 177/25.16; 177/238

(58) Field of Classification Search
CPC ... G01G 19/4146; G01G 21/22; G01G 21/28; G09B 19/0092; A47G 29/141; A47G 19/32; A45C 11/20; A45C 15/00; A45C 2013/026
USPC ................................ 177/25.16, 238; 206/216
See application file for complete search history.

(56) References Cited

U.S. PATENT DOCUMENTS 3,016,129 A * 1/1962 King, III ....................... 206/545
3,532,247 A * 10/1970 Bridges .......................... 220/23.6
(Continued)

FOREIGN PATENT DOCUMENTS

| CN | 2219653 Y | 2/1996 |
|---|---|---|
| CN | 1138494 C | 2/2004 |

(Continued)

OTHER PUBLICATIONS

International Search Report of International Application No. PCT/CN2011/070492, dated Jan. 21, 2011.

*Primary Examiner* — Randy W Gibson
(74) *Attorney, Agent, or Firm* — J.C. Patents

(57) ABSTRACT

The invention relates an intelligent lunch box, mainly comprising a start button, containers for containing food and with open tops, a movable cover plate for controlling the opening and closing of the containers, a motor for controlling the opening and closing of the cover plate, a controller for controlling the running of the motor, a memory having a diet database, a touch display, and weight sensors for sending the weights of the containers to the controller, wherein the start button is electrically connected with the controller, the memory, the motor and the touch display, respectively; the controller is electrically connected with the memory, the motor and the touch display, respectively; the controller is a single-chip computer or a CPU (Central Processing Unit). The lunch box of the present invention is simple in structure, and safe and convenient in use.

14 Claims, 13 Drawing Sheets

(51) Int. Cl.
*G01G 19/52* (2006.01)
*G01G 21/22* (2006.01)
*G01G 21/28* (2006.01)
*A47G 29/14* (2006.01)
*G01G 19/414* (2006.01)
*A47G 19/32* (2006.01)
*A45C 15/00* (2006.01)
*A45C 13/02* (2006.01)

(56) References Cited

U.S. PATENT DOCUMENTS

| | | | | |
|---|---|---|---|---|
| 3,678,248 | A | * | 7/1972 | Tricault et al. ............... 219/525 |
| 3,915,304 | A | * | 10/1975 | Pasco et al. ................... 206/545 |
| 4,961,533 | A | * | 10/1990 | Teller et al. ................. 177/25.19 |
| 5,560,653 | A | * | 10/1996 | Beppu .......................... 283/117 |
| 5,883,336 | A | * | 3/1999 | Jones ......................... 177/25.17 |
| 6,296,488 | B1 | * | 10/2001 | Brenkus et al. ................ 434/127 |
| 6,541,713 | B2 | * | 4/2003 | White ........................ 177/25.16 |
| D484,746 | S | * | 1/2004 | McMullin .................... D7/553.6 |
| D568,687 | S | * | 5/2008 | Lovett ........................ D7/553.3 |
| 8,330,057 | B2 | * | 12/2012 | Sharawi et al. ............ 177/25.16 |
| 8,770,983 | B2 | * | 7/2014 | Batsikouras ................. 434/127 |
| 2007/0289973 | A1 | * | 12/2007 | Acosta et al. ................ 220/507 |
| 2010/0038149 | A1 | * | 2/2010 | Corel ......................... 177/25.16 |
| 2013/0256041 | A1 | * | 10/2013 | Collins et al. ..................... 177/2 |

FOREIGN PATENT DOCUMENTS

| | | |
|---|---|---|
| CN | 200983926 Y | 12/2007 |
| CN | 101822455 A | 9/2010 |
| JP | 2001-169818 A | 6/2001 |
| KR | 10-0931259 B1 | 12/2009 |

* cited by examiner

INTELLIGENT LUNCH BOX

CROSS-REFERENCE TO RELATED APPLICATIONS

This application is a continuation of International Application No. PCT/CN2011/070492, filed on Jan. 21, 2011, which claims the priority benefit of China Patent Application No. 201010137321.8, filed on Mar. 31, 2010. The contents of the above identified applications are incorporated herein by reference in their entirety.

FIELD OF THE TECHNOLOGY

The present invention relates to a lunch box, in particular to a lunch box which can calculate, allocate and control the weight and varieties of the food taken by a person, record the amount of food, generate a dietary, and allocate the nutritive proportion by recording and inputting the diet history of a user.

BACKGROUND

The existing lunch box consists of a lunch box cover, a lunch box wall, a lunch box bottom and a lunch box handle, generally serves as food containing ware, and has the disadvantages of: 1. not being able to record the history, amount and category of diet clearly when in use; 2. not being able to analyze whether the history, amount, category and nutritive proportion of the diet conform to the standards of healthy diet of a human body, or judge whether the diet is necessary for the human body; 3. not being able to collocate the meals or generate a dietary according to the physiological and pathological parameters of a human body; 4. not being able to remind a user of excess of some nutrient intake, or lack of some nutrient intake; and 5. not being able to prevent the user from taking some food excessively, thereby resulting in nutritional imbalance to cause diseases, or overnutrition to cause obesity.

SUMMARY

One object of the present invention is to provide an intelligent lunch box which can record the diet history, generate a dietary, remind of insufficient or excessive intake, and avoid an excessive intake, and therefore overcome the disadvantage that the existing lunch box can only serve as food containing ware.

For the above purposes, the present invention provides an intelligent lunch box, mainly comprising a start button, containers with open tops for containing food, a movable cover plate for controlling the opening and closing of the containers, a motor for controlling the opening and closing of the cover plate, a controller (a single-chip computer or a CPU (Central Processing Unit)) for controlling the running of the motor, a memory with a diet database, a touch display, and weight sensors (also known as pressure sensors) for sending the weights of the containers to the CPU, wherein the start button is electrically connected with the controller, the memory, the motor and the touch display, respectively; the controller is electrically connected with the memory, the motor, the weight sensors and the touch display, respectively.

When having meals, people input the age, gender, height, weight, pathological and physiological parameters and the like of a user by the touch display; when food (meat, vegetables, fruits, staple food, soup and the like) is contained in the containers of the lunch box, the weight sensors transmit the measurement data of the food to the CPU which records and analyzes whether the food in the containers is suitable for the user to take according to the input age, gender, height, weight and pathological and physiological parameters of the user, together with the memory comprising the diet database, and the time, provides a healthy diet dietary suitable for the user according to the historic records and analytical results, and controls the opening, closing or half-opening of the containers to allow or not allow the user to take the food, or allow the user to take certain food, thereby achieving the purposes of controlling the categories and amount of the food taken.

In order to better control the opening and closing of the containers, one design of the present invention is that:

The rear end of the cover plate extends to the rear side faces of the containers, and racks and open pores are longitudinally arranged at the left and right ends of the cover plate; an output shaft of the motor is provided with a motor gear; a transmission shaft extending transversely is arranged on the rear side faces of the containers; a transmission shaft gear is arranged at the transmission shaft, corresponding to the racks; the motor gear is engaged with the transmission shaft gear, and the transmission shaft gear is engaged with the racks or the open pores.

The other design is that the rear end of the cover plate extends to the rear side faces of the containers, and racks and the plurality of sequentially adjacent open pores are longitudinally arranged at the left and right ends of the cover plate; an output shaft of the motor is provided with a motor gear; a transmission shaft extending transversely is arranged on the rear side faces of the containers; a transmission shaft gear is arranged at the transmission shaft, corresponding to the racks, and the transmission shaft gear is engaged with the racks or the open pores; a motor gear is engaged with the gear in the middle of the transmission shaft.

By adopting the above two designs, the motor is controlled to rotate forwardly and reversely to achieve the opening and closing of the cover plate. The rotation of the motor is stopped to achieve the half opening state of the cover plate in the process of opening or closing the cover plate.

For the convenience of the movement of the containers, the lunch box of the present invention is further provided with a container bracket used for accommodating the containers and composed of a bottom plate at the bottom, and a front side wall, a rear side wall, a left side wall and a right side wall that are arranged at the four edges of the upper surface of the bottom plate and extend upwards. The four edges of the tops of the containers extend outwards to form outer edges. As the containers are placed in the container bracket, the outer edges are just lapped at the top of the container bracket. The rear end of the cover plate extends to the rear side wall of the container bracket and then extends downwards to the place to allow the racks or open pores to be engaged with the transmission shaft gear. The transmission shaft is arranged behind the rear side wall of the container bracket. In addition, the weight sensors can be arranged on the bottom plate, and are in contact with the bottoms of the containers when the containers are placed in the container bracket.

A left chute and a right chute that have openings at the inner sides are arranged above the left side wall and right side wall of the container bracket respectively, the distances from the inner sides of the left chute and right chute to the inner sides of the left side wall and right side wall of the container bracket are at least equal to the widths of the outer edges of the containers, and the left edge and right edge of the cover plate are arranged in the left chute and right chute respectively via the openings.

The left edge and right edge of the cover plate are arranged in the chutes respectively via the openings, in this way, due to the fact that the two ends of the cover plate are guided and fixed by the chutes all the time in the opening and closing process of the cover plate, the front and back stress stability of the cover plate is ensured in the opening and closing process, and the cover plate is not easy to open.

When at least three containers are adopted, they are sequentially placed in the container bracket from left to right.

For the convenience of container holding, trays are arranged between the left side wall and the right side wall of the container bracket; tray holes large enough for the containers to pass through are arranged in the trays, corresponding to the containers; stop blocks are arranged at the upper parts of the internal surfaces of the left side wall and right side wall of the container bracket; left plate walls and right plate walls of the trays are placed on the stop blocks; rear plate walls of the trays are placed on the rear side wall of the container bracket; handles are arranged on the external surfaces of a front plate wall of the trays; baffles are arranged between the adjacent containers; the bottoms of the baffles are fixedly connected with the bottom plate of the container bracket; the heights of the baffles are the same as the height of the left side wall or right side wall of the container bracket; the front and rear ends of the baffles are fixedly connected with the front side wall and rear side wall of the container bracket; baffle chutes provided with openings at the left sides and the right sides and extending longitudinally are arranged above the baffles; the baffle chutes, and the left chute or right chute are in the same horizontal plane; a cover plate is arranged between the left side wall of the container bracket and the baffle adjacent thereto, between two adjacent baffles, and between the right side wall of the container bracket and the baffle adjacent thereto;

In addition, the left edge and right edge of the cover plate between the left side wall and the baffle adjacent thereto are arranged in the left chute and the baffle chute respectively; the left edge and right edge of the cover plate between the two adjacent baffles are arranged in the two baffle chutes respectively; the left edge and right edge of the cover plate between the right side wall of the container bracket and the baffle adjacent thereto are arranged in the right chute and the baffle chute respectively; a transmission shaft and a motor are adopted corresponding to each cover plate; chute holes allowing the baffle chutes to penetrate through are arranged in the trays, corresponding to the baffle chutes; in this way, the trays cannot affect the opening and closing of the cover plate.

As there're at least three containers, they are sequentially placed in the container bracket; the baffles are arranged between the adjacent containers; the bottoms of the baffles are fixedly connected with the bottom plate of the container bracket; the heights of the baffles are the same as the height of the left side wall or right side wall of the container bracket; the front and rear ends of the baffles are fixedly connected with the front side wall and rear side wall of the container bracket; the trays are arranged between the left side wall of the container bracket and the baffle adjacent thereto, between the two adjacent baffles, and between the right side wall of the container bracket and the baffle adjacent thereto; the tray holes large enough for the containers to pass through are arranged in the trays, corresponding to the containers; the stop blocks are arranged at the upper parts of the internal surfaces of the left side wall and right side wall of the container bracket, and at the upper parts of the left side faces and right side faces of the baffles; the left plate walls and right plate walls of the tray are placed on the stop blocks; the rear plate walls of the trays are placed on the rear side wall of the container bracket; the handles are arranged on the external surfaces of the front plate walls of the trays; in addition, the baffle chutes provided with the openings at the left sides and right sides and extending longitudinally are arranged above the baffles; the baffle chutes and the left chute or right chute are in the same horizontal plane; the cover plates are arranged between the left side wall of the container bracket and the baffle adjacent thereto, between the two adjacent baffles, and between the right side wall of the container bracket and the baffle adjacent thereto; the left side wall of the container bracket as well as the left edge and right edge of the cover plate of the baffle adjacent thereto are arranged in the left chute and the baffle chutes respectively; the left edge and right edge of the cover plate between the two adjacent baffles are arranged in the two adjacent baffle chutes; the right side wall of the container bracket as well as the left edge and right edge of the cover plate between the baffle adjacent thereto are arranged in the right chute and the baffle chutes; a transmission shaft and a motor are adopted corresponding to each cover plate.

For the convenience of carry and placement, the intelligent lunch box further comprises a housing arranged outside the container bracket, wherein a left side plate and a right side plate of the housing are connected with outer edges of the left end and right end of the rear side wall of the container bracket respectively; a rear panel of the housing is arranged behind the motor; the top surface and the front panel of the housing are in a U shape; a transverse part of the top surface of the housing is fixedly connected with the top end of a rear panel of the housing; the outer edges of a left longitudinal part and a right longitudinal part of the top surface of the housing are fixedly connected with the top ends of the left side plate and the right side plate of the housing respectively; the inner edges of the left longitudinal part and the right longitudinal part of the top surface of the housing are fixedly connected with the left side wall and the right side wall of the container bracket respectively;

The bottom end of the transverse part of the front panel is fixedly connected with the front end of the bottom surface of the housing; the upper end of the transverse part is fixedly connected with the front side wall of the container bracket, and is lower than the lower edges of the trays; the outer edges of a left vertical part and a right vertical part of the front panel are fixedly connected with the front ends of the left side plate and the right side plate respectively; the tops of the left vertical part and right vertical part are fixedly connected with the front end of the left longitudinal part and the right longitudinal part of the top surface respectively; the inner sides of the left vertical part and the right vertical part are fixedly connected with extending parts of the tops of the left side wall and the right side wall of the container bracket;

The touch display and the start button are arranged at the transverse part of the top surface of the housing; the transverse part is further provided with a loudspeaker which is electrically connected with the controller; at least three cavities are longitudinally arranged in at least one container; a temperature sensor for monitoring the temperature of the containers; the controller and the memory are fixed on the external surface of the rear side wall of the container bracket, or fixed on the internal surface of the rear panel of the housing, or fixed on the internal surface of the top of the housing; a battery case is arranged on the rear panel of the housing; a motor mounting plate for mounting the motor is arranged on the inner panel of the battery case; a left fixing plate and a right fixing plate for fixing the transmission shafts are arranged at the left side and the right side of the motor mounting plate. The transmission shafts are sequentially arranged from left to right, wherein the two ends of the transmission shaft at the left side are fixed between the rear side wall of the container bracket and the battery case respectively by the bearing support on the right side plate of the housing and the bearing support on the left side face of the left fixing plate, and the motor for driving the transmission shaft is arranged at the left end of the motor mounting plate. The two ends of the transmission shaft at the right are fixed between the rear side wall of the container bracket and the battery case respectively by the bearing support on the left side plate of the housing and the bearing support on the right side face of the right fixing plate, and the motor for driving the transmission shaft is arranged at the right end of the motor mounting plate. The two ends of the transmission shaft in the middle are fixed between the rear side wall of the container bracket and the battery case respectively by the bearing support on the right side face of the left fixing plate and the bearing support on the left side face of the right fixing plate, and the motor for driving the transmission shaft is correspondingly arranged between the two ends of the motor mounting plate. In addition, the left chute and the right chute are arranged on the internal surfaces of the left longitudinal part and the right longitudinal part of the top surface of the housing respectively; the baffle chutes are arranged on the internal surface of a forward extending part of the top surface of the housing; the forward extending part is arranged over the baffle chutes, and extends forward from the transverse part to the front ends of the baffle chutes at least; or the left chute and the right chute are respectively fixed at the tops of the left side wall and the right side wall of the container bracket; the baffle chutes are fixed at the tops of the baffles.

DETAILED DESCRIPTION

Figure 1:
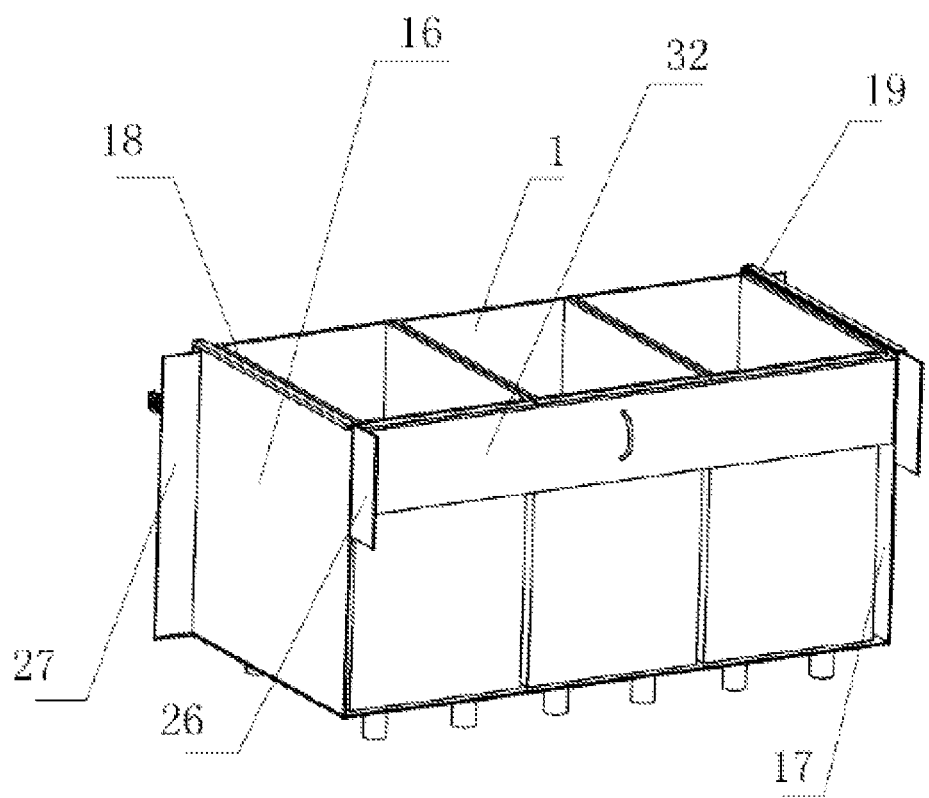
FIG. 1 is a schematic diagram of an intelligent lunch box of the present invention, without a housing and with a cover plate in an open position.
Figure 2:
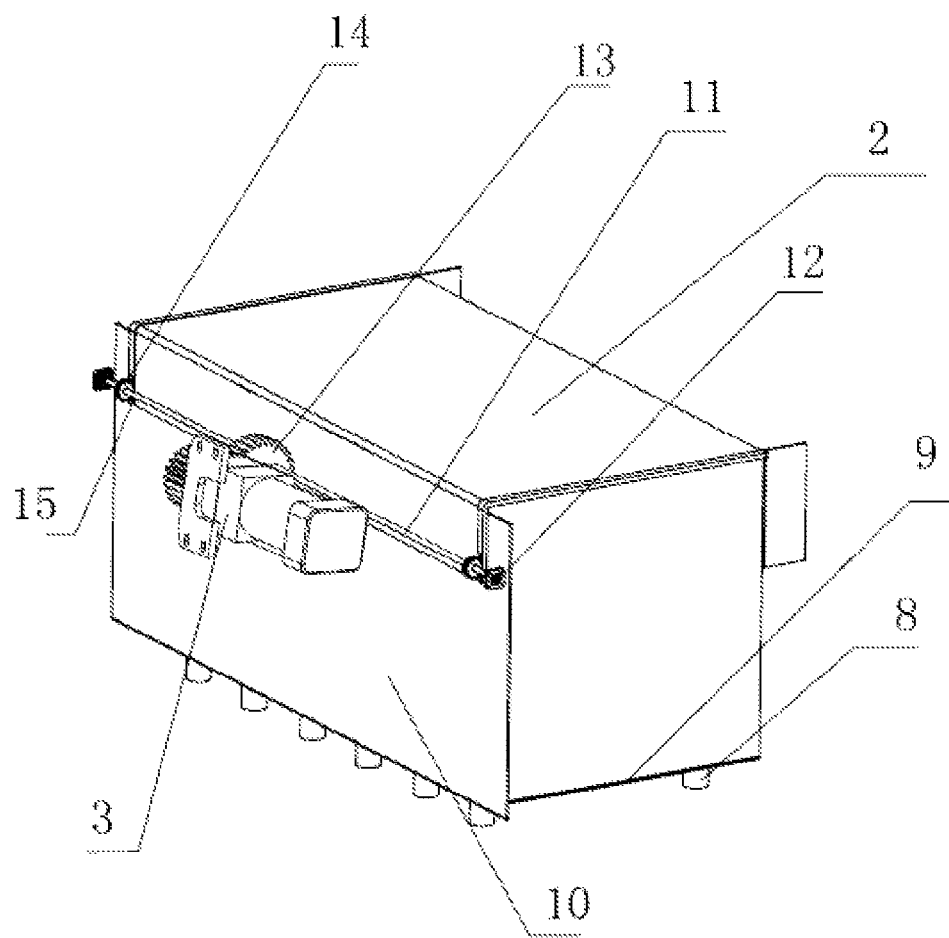
FIG. 2 is a schematic diagram of an intelligent lunch box of the present invention, without a housing and with a cover plate in a closed position.
Figure 3:
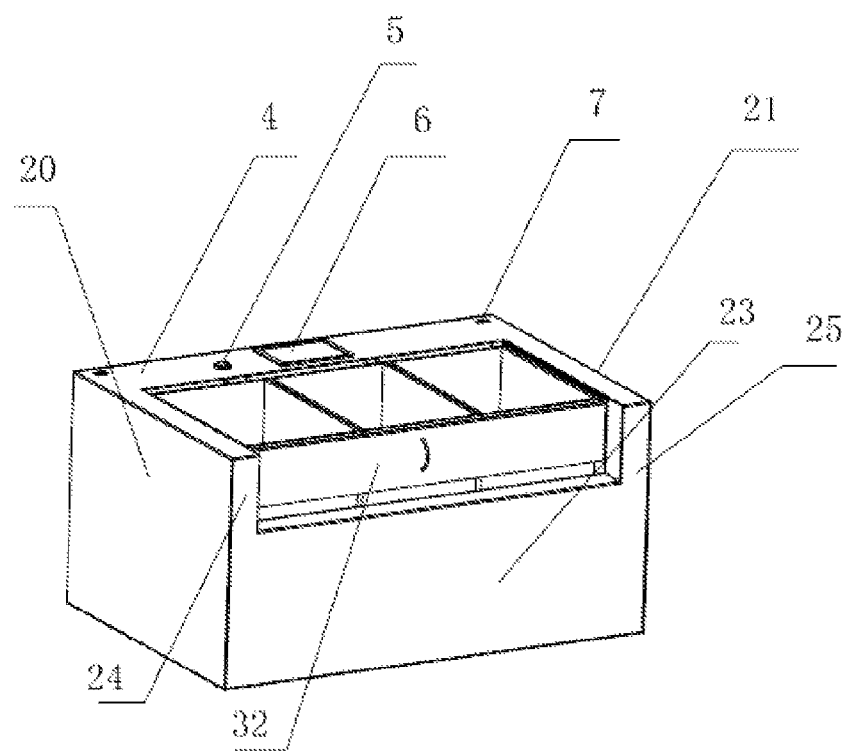
FIG. 3 is a schematic diagram of an intelligent lunch box with a housing and an opened cover plate.
Figure 4:
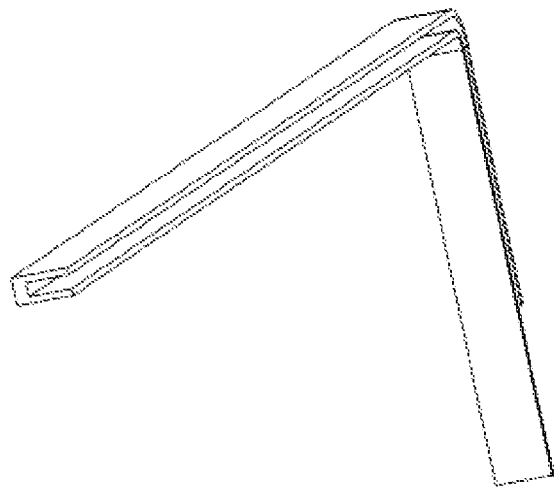
FIG. 4 is a structural schematic diagram of the downbent rear end of a chute.
Figure 5:
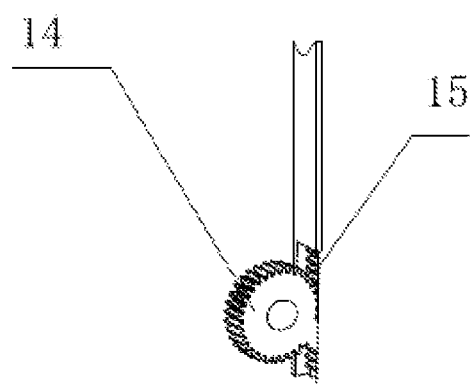
FIG. 5 is an enlarged schematic diagram in which a rack at the edge of a cover plate with the rack, extending to the external surface of a rear side wall of a container bracket, is engaged with a transmission gear.

Refer to FIGS. 1, 2 and 3 for an intelligent lunch box provided by an embodiment, mainly comprising containers 1 with open tops for containing food, and a movable cover plate 2 arranged at the tops of the containers 1 and used for controlling the opening and closing of the containers, a motor 3 for controlling the opening and closing of the cover plate 2, a controller (a single-chip computer or a CPU) for controlling the running of the motor 3, a memory with a diet database, a start button 5 arranged at a transverse part 4 on the top surface of a housing, a touch display 6, a voice prompt device (e.g., a loudspeaker 7) which is electrically connected with the controller), and weight sensors 8 (pressure sensors) for sending the weights of the containers 1 to the CPU, wherein the weight sensors 8 are arranged on a bottom plate 9 of a container bracket for accommodating the containers 1, the motor 3 is arranged at the rear end of the cover plate 2, particularly on the rear side of a rear side wall 10 of the container bracket; a transmission shaft 11 is further arranged on the rear side of the rear side wall 10, the two ends of the transmission shaft 11 are fixedly connected with bearing supports 12 at the left and right ends of the external surface of the rear side wall 10 respectively (or, the bearing supports are fixed on the internal surfaces of a left side plate 20 and a right side plate 21 of the housing respectively, and accordingly, the bearing supports 12 are fixedly connected with the housing), and the transmission shaft 11 is fixed between the rear side wall 10 and the motor 3. The motor 3 is engaged (gear engaged) with a gear 13 in the middle of the transmission shaft 11 by a motor gear on an output shaft of the motor 3, and transmission gears 14 at the two ends of the transmission shaft 11 are engaged with longitudinal racks (transverse open pores) 15 at the left and right edges of the cover plate 2 respectively (as shown in FIG. 4), thereby driving the cover plate 2 to move forward and backward. It's worth noting that the rear end of the cover plate 2 needs to extend to the external surface of the rear side wall 10 of the container bracket, to ensure that the racks or transverse open pores at the left and right edges of the cover plate 2 can be engaged with the transmission gears 14 at the ends of the transmission shaft 11 respectively.

Certainly, the gear 13 in the middle of the transmission shaft 11 can be removed, and only the motor gear on the output shaft of the motor 3 drives the transmission gears 14 at the ends of the transmission shaft 11. In addition, racks or a plurality of sequentially adjacent open pores 15 can be longitudinally arranged in the middle of the cover plate 2, and directly engaging with the motor gear of the motor 3, to drive the cover plate 2. In this way, the transmission shaft 11 can be omitted; the structure is simplified; the cost is lowered.

The opening and closing of the cover plate 2 is achieved, simply by controlling the motor 3 rotate forwardly and reversely. The rotation of the motor 3 can be stopped to achieve a half opening state of the cover plate 2 in the process of opening or closing the cover plate 2.

In this embodiment, as shown in FIG. 1, in order to ensure the stable longitudinal movement of the cover plate 2 in the opening and closing process (without left and right shift), and that the cover plate 2 cannot be lifted up easily, a left chute 18 and a right chute 19 with openings at the inner sides are arranged above the tops of a left side wall 16 and a right side wall 17 of the container bracket respectively; the left and right edges of the cover plate 2 are arranged in the left chute 18 and the right chute 19, respectively; the left chute 18 and the right chute 19 guide and orient the cover plate 2 in the forward and backward movement process of the cover plate 2; in addition, the openings are arranged at the inner sides of the left chute 18 and the right chute 19, which ensures that the cover plate 2 cannot be lifted up easily.

The containers 1 are placed in a cavity, which is formed by the four side walls and the bottom plate 9 of the container bracket, that is, the outer edges of the tops of the containers 1 are just lapped at the top edges of the four side walls of the container bracket when the containers 1 are placed in the container bracket, to ensure that the containers 1 do not continue to drop, while the cover plate 2 is used for opening or closing openings at the tops of the containers 1; when the left chute 18 and the right chute 19 are needed to guide and stabilize the cover plate 2, and when inner sides of the left chute 18 and right chute 19 are fixed partially (or wholly) at the tops of the left side wall 16 and the right side wall 17, the distances from the inner sides of the left chute 18 and the right chute 19 to inner sides of the left side wall 16 and the right side wall 17 of the container bracket are equal to or larger than the width of the outer edge of the top of container 1, respectively, to guarantee the lapping space of the outer edges of the tops of the containers 1 at the top of the container bracket, and facilitate stably accommodating the containers 1.

Figure 10:
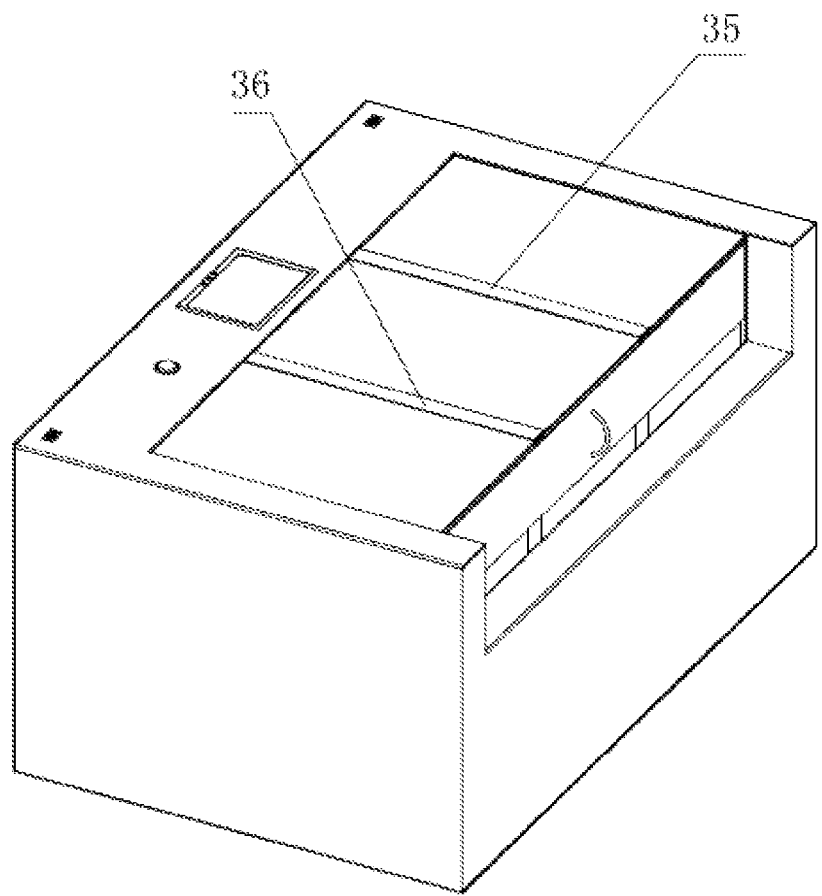
FIG. 10 is a structural schematic diagram in which three container brackets are sequentially arranged from left to right into a whole and share a cover plate and a tray.
Figure 11:
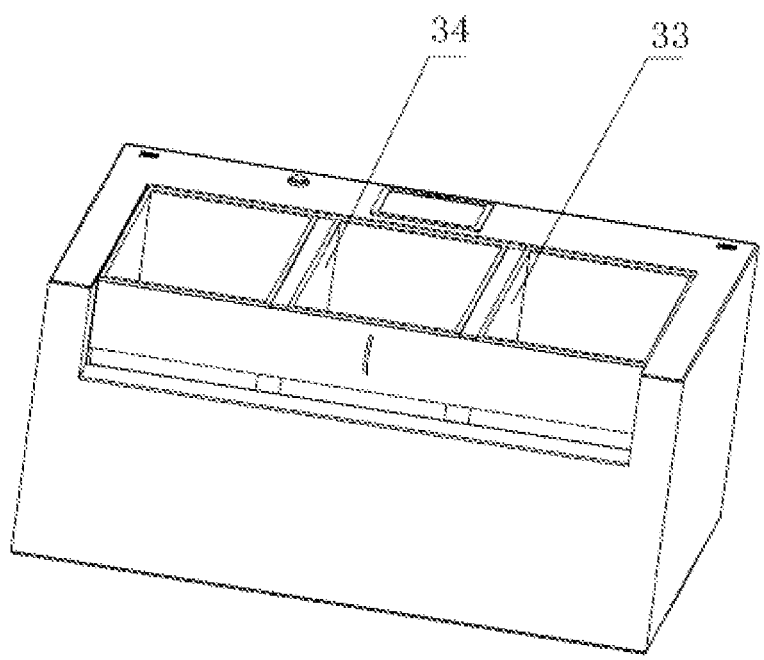
FIG. 11 is a structural schematic diagram of FIG. 10 as a cover plate is opened.

One of the main purposes of adopting a container bracket is to facilitate the handling of the container 1, when there are a plurality of containers 1, such as three containers 1, which are sequentially arranged from left to right. There are two arrangements for this structure, one is that three containers 1 are sequentially arranged between the left side wall 16 and the right side wall 17 of the container bracket, and share one cover plate 2 (one container bracket, three containers, and one cover plate). The other is that not only three containers 1 are adopted and arranged in sequence from left to right, each container 1 is also individually provided with a container bracket with a left chute and a right chute arranged at the tops of the left side wall and the right side wall respectively, a cover plate 2 for opening and closing the container 1, and a motor for driving the cover plate 2. The adjacent container brackets are in fixed connection with each other. Such a structure corresponds to that three mutually independent container brackets are fixedly connected with each other in sequence with each container bracket being provided with an independent motor 3 and a independent cover plate 2. The opening and closing of the cover plates 2 are independent and do not affect each other. As shown in FIG. 10 and FIG. 11, the difference is that every two adjacent container brackets share a side wall (equivalent to a baffle) in FIG. 10 and FIG. 11, that is, only one baffle 33 or 34 is needed to replace two adjacent side walls in the practical manufacturing process (as shown in FIG. 11), to be shared by two adjacent container brackets; in this way, the structure can be simplified, the layout is compact and attractive, the materials can be saved, the cost is lowered. It is worth noting that the heights of the baffles 33 and 34 are the same as the height of the left side wall 16 or the right side wall 17 of the container bracket, and the front and rear ends of the baffles are fixedly connected with the front side wall and rear side wall of the container bracket.

Figure 6:
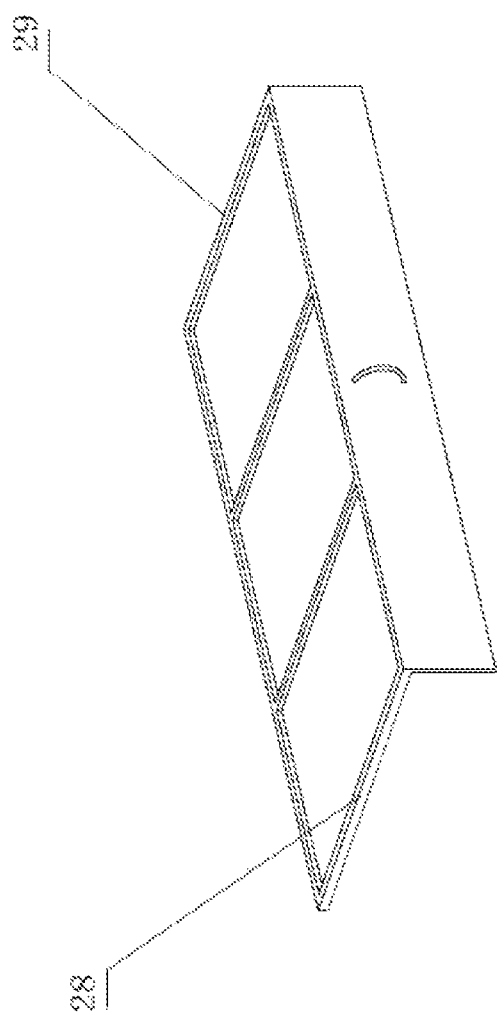
FIG. 6 is a schematic diagram of a tray of the present invention.
Figure 7:
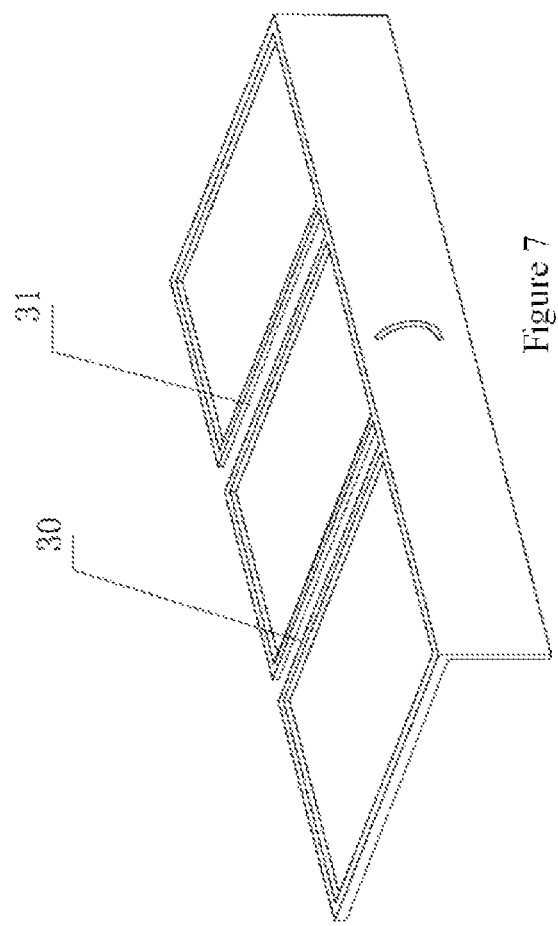
FIG. 7 is a schematic diagram of a tray with chute holes.

As shown in FIG. 3, for the convenience of container handling, a tray 32 can be arranged between the left side wall 16 and the right side wall 17 of the container bracket of the intelligent lunch box. As shown in FIG. 6, a tray hole is arranged in the tray 32 corresponding to each of the containers 1. The tray holes are large enough for the containers 1 to pass through the tray holes to be placed into the container bracket, and the outer edges of the containers 1 are lapped at the top of the tray 32 to allow the containers to be supported on the tray. A stop block is arranged at each of the front and rear ends of the internal surfaces of the left side wall 16 and the right side wall 17 of the container bracket, respectively. A left plate wall 28 and a right plate wall 29 of the tray 32 are arranged on the stop blocks, a rear plate wall of the tray 32 is placed at the top of the rear side wall 10 of the container bracket. A handle is arranged on the outer side face of a front plate wall of the tray 32 to facilitate handling, such tray structure is suitable for both the first arrangement of the container and the container bracket described above (i.e., one container bracket, three containers 1 arranged in sequence from left to right, and one tray 32 shared by the three containers 1) and the second arrangement. However, there are three trays 32 in the second arrangement, that is, a tray 32 is arranged between the left side wall 16 and the right side wall 17 of each container bracket. If the three container brackets (the containers 1) share one tray 32 in the second arrangement, the difference in the structure of the tray 32 lies in that, as shown in FIG. 6, the tray 32 is arranged at the tops of the container brackets, and chute holes 30 and 31 are arranged in the tray 32, corresponding to the left chutes 18 or right chutes 19, for allowing the left chutes 18 or right chutes 19 to penetrate therethrough, which ensures that the tray 32 does not affect the opening and closing of the cover plate 2 of each container 1. In the practical application of the chute hole 31, two chutes penetrate through the chute hole 31, since the chute hole 31 is arranged at the junction of two adjacent container brackets. Therefore, the quantity of the chute holes in the tray 32 is reduced, and the structure is simplified due to such design.

A plurality of (such as three) cavities are longitudinally arranged in each of the container 1 in order to prevent different dishes from being tainted by other odor.

The start button 5 is electrically connected with the controller, the memory, the motor 3 and the touch display 6, and the controller is connected with the memory, the motor 3 and the touch display 6 by control lines.

A left side plate 20 and a right side plate 21 of the housing are connected with outer edges 27 (see FIG. 1) of the left end and right end of the rear side wall 10 of the container bracket, respectively; a rear panel 22 of the housing (see FIG. 8) is arranged at the rear of the motor 3; as shown in FIG. 3, the top surface and the front panel of the housing are in a U shape; a transverse part 4 of the top surface of the housing is fixedly connected with the top end of the rear panel 22 of the housing; the outer edges of a left longitudinal part and a right longitudinal part of the top surface of the housing are fixedly connected with the top ends of the left side plate 20 and the right side plate 21 of the housing, respectively; the inner edges of the left longitudinal part and the right longitudinal part of the top surface of the housing are fixedly connected with the left side wall 16 and the right side wall 17 of the container bracket, respectively.

Figure 8:
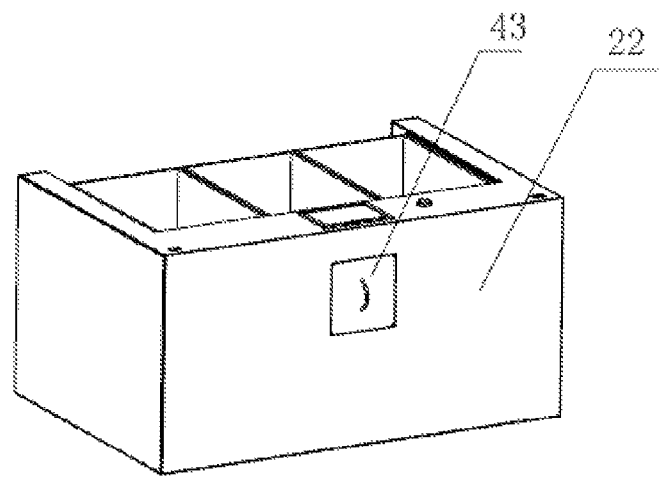
FIG. 8 is a back view of an intelligent lunch box with a housing and an opened cover plate.
Figure 9:
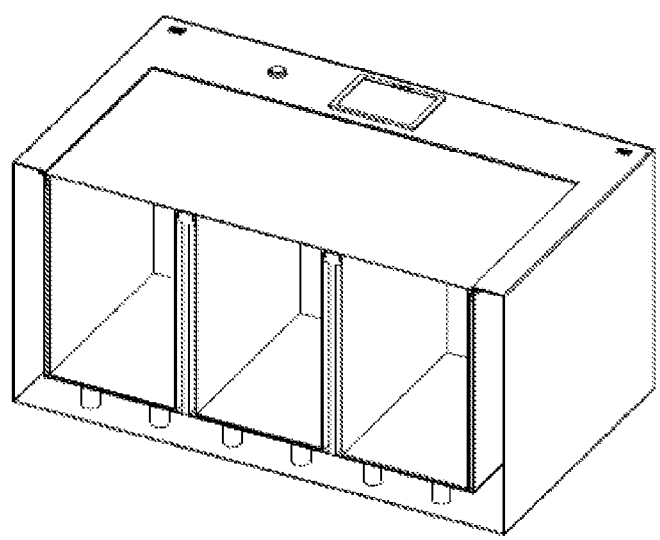
FIG. 9 is a schematic diagram of an intelligent lunch box with three container brackets and a cover plate, the front part of which has been cut off downwards.

The bottom end of a transverse part 23 of the front panel of the housing is fixedly connected with the front end of the bottom surface of the housing; the upper end of the transverse part 23 of the front panel of the housing is connected with the front side wall of the container bracket, and is lower than the lower edge of the tray; the outer edges of a left vertical part 24 and a right vertical part 25 of the front panel of the housing are fixedly connected with the front ends of the left side plate 20 and the right side plate 21 of the housing; the tops of the left vertical part 24 and the right vertical part 25 are fixedly connected with the front ends of the left longitudinal part and the right longitudinal part of the top surface of the housing respectively; the inner sides of the left vertical part 24 and the right vertical part 25 are fixedly connected with extending parts 26 (see FIG. 1) of the tops of the left side wall 16 and the right side wall 17 of the container bracket, respectively; as shown in FIG. 8, a battery case 43 is arranged on the rear panel 22 of the housing for accommodating a storage battery to supply power to the motor 3;

In the present invention, the controller and the memory are fixed on the external surface of the rear side wall 10 of the container bracket, or on the internal surface of the rear panel 22 of the housing (in addition, the two ends of the transmission shaft 11 can also be fixedly connected with the bearing supports on the internal surfaces of the left side plate 20 and the right side plate 21 of the housing respectively), or on the internal surface of the transverse part 4 of the top of the housing, generally right behind the touch display.

Meanwhile, in order to ensure that the food temperature meets the requirements, a temperature sensor is arranged on the internal wall of the container bracket in the present invention for monitoring the food temperature and ensuring the appropriate taken food temperature.

In order to ensure the independence of the opening and closing of the three independent cover plates 2 as shown in FIGS. 10 and 11, a specific structure is as follows, see FIGS. 12 and 13: baffle chutes 35 and 36 extending longitudinally and provided with openings at the left sides and the right sides are arranged above the baffles 33 and 34 shared by the adjacent container brackets; the baffle chutes, the left chutes 18 and the right chutes 19 are in the same horizontal plane; a cover plate is arranged between the left side wall 16 of each container bracket and the baffle 34 adjacent thereto, between every two adjacent baffles 34 and 33, and between the right side wall 17 of each container bracket and the baffle 33 adjacent thereto, respectively; the left edge and right edge of the cover plate between the left side wall 16 of each container bracket and the baffle 34 adjacent thereto are arranged in the left chute 18 and baffle chute 36, respectively; the left edge and right edge of the cover plate between every two adjacent baffles 34 and 33 are arranged in the two adjacent baffle chutes 35 and 36, respectively; the left edge and right edge of the cover plate between the right side wall 17 of each container bracket and the baffle 33 adjacent thereto are arranged in the right chute 19 and baffle chute 36, respectively; each cover plate is provided with a transmission shaft 37, 38 or 39 and a motor 40, 41 or 42; a motor mounting plate for mounting the motors 40, 41 and 42 are arranged on the inner panel of the battery case on the rear panel 22 of the housing; a left fixing plate 45 and a right fixing plate 46 for fixing the transmission shafts 37, 38 and 39 are arranged at the left and right ends of the motor mounting plate 44; the two ends of the transmission shaft 37 at the left are fixed between the rear side wall 10 of the container bracket and the battery case 43 respectively by the bearing support on the right side plate 21 (see FIG. 3) of the housing and the bearing support on the left side face of the left fixing plate 45; the motor 40 for driving the transmission shaft 37 is correspondingly arranged at the left end of the motor mounting plate 44, particularly on the motor mounting plate at the bottom left of the left fixing plate.

The two ends of the transmission shaft 38 in the middle are fixed between the rear side wall 10 of the container bracket and the battery case 43 respectively by the bearing support on the right side face of the left fixing plate 45 and the bearing support on the left side face of the right fixing plate; the motor 41 for driving the transmission shaft 38 is correspondingly arranged between the two ends of the motor mounting plate, particularly on the motor mounting plate near bottom left of the right fixing plate 46.

The two ends of the transmission shaft 39 at the right are fixed between the rear side wall 10 of the container bracket and the battery case 43 respectively by the bearing support on the left side plate 20 (see FIG. 3) of the housing and the bearing support on the right side face of the right fixing plate 46; the motor 42 for driving the transmission shaft 39 is correspondingly arranged at the right end of the motor mounting plate, particularly on the motor mounting plate near the bottom right of the right fixing plate 46 and adjacent to the motor 38.

Figure 14:
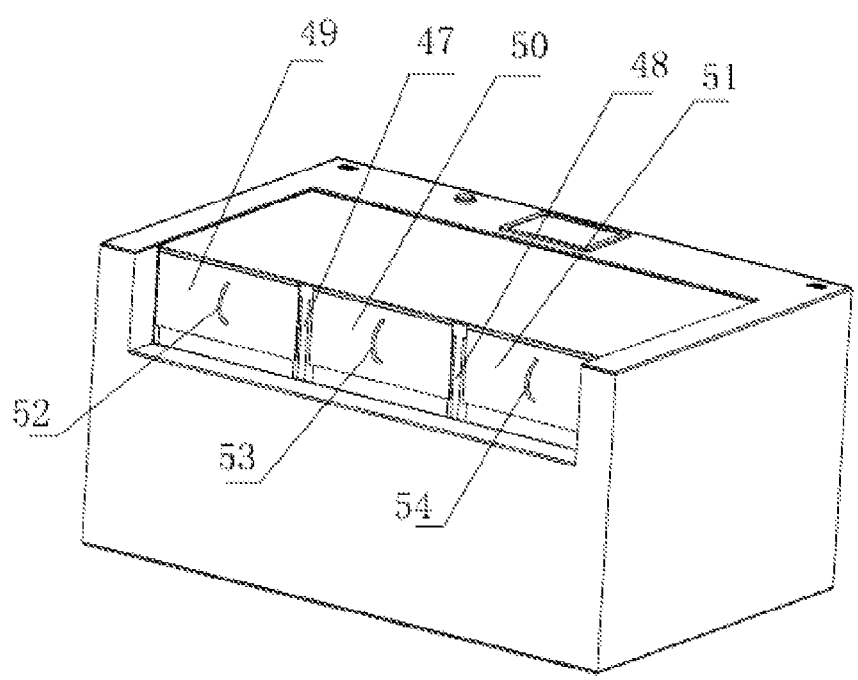
FIG. 14 is a structural schematic diagram of an intelligent lunch box of the present invention provided with three containers, a cover plate and three trays.

Refer to FIG. 14, in the intelligent lunch box of this embodiment, there are at least three containers sequentially arranged in the container bracket from left to right; the baffles 47 and 48 are arranged between the adjacent containers; the bottoms of the baffles 47 and 48 are fixedly connected with the bottom plate 9 (see FIG. 2) of the container bracket; the heights of the baffles 47 and 48 are the same as the height of the left side wall 16 or right side wall 17 (see FIG. 1) of the container bracket; the front and rear ends of the baffles 47 and 48 are fixedly connected with the front and rear side walls of the container bracket.

The trays 49, 50 and 51 are arranged between the left side wall 16 of the container bracket and the baffle adjacent thereto, between the two adjacent baffles 47 and 48, and between the right side wall 17 of the container bracket and the baffle 48 adjacent thereto, respectively; the tray holes (similar to the tray holes as shown in FIG. 6; here, one tray hole is arranged in each tray) large enough for the containers to pass through are arranged in the trays 49, 50 and 59, corresponding to the containers; the stop blocks (one stop block is generally arranged at each of the front and rear ends of the side wall, which is secure) are arranged at the upper parts of the internal surfaces of the left side wall 16 and right side wall 17 of the container bracket and the upper parts of the left side faces and right side faces of the baffles 47 and 48; the left plate walls and right plate walls of the trays are placed on the stop blocks; the front plate walls and the rear plate walls of the trays are placed on the front side wall and the rear side wall of the container bracket; the handles 52, 53 and 54 are arranged on the external surfaces of the trays; it can be seen, the intelligent lunch box of this embodiment is provided with three container brackets; each container can be placed in each container bracket; and one independent tray is arranged on each container bracket; the three container brackets share one cover plate.

Figure 12:
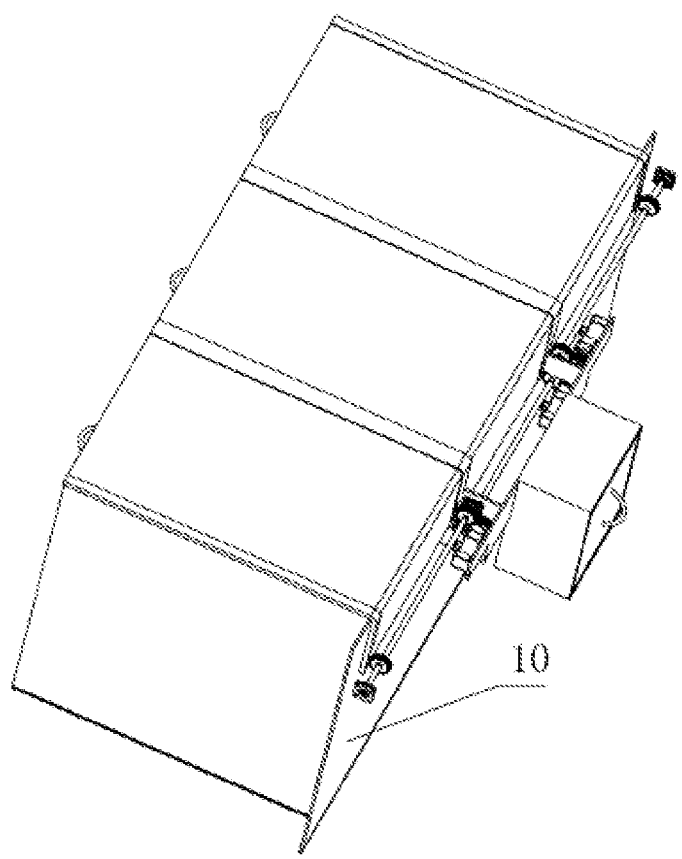
FIG. 12 is a schematic diagram of an arrangement structure of a transmission shaft and a motor as an intelligent lunch box of the present invention is provided with three containers and three cover plates.
Figure 13:
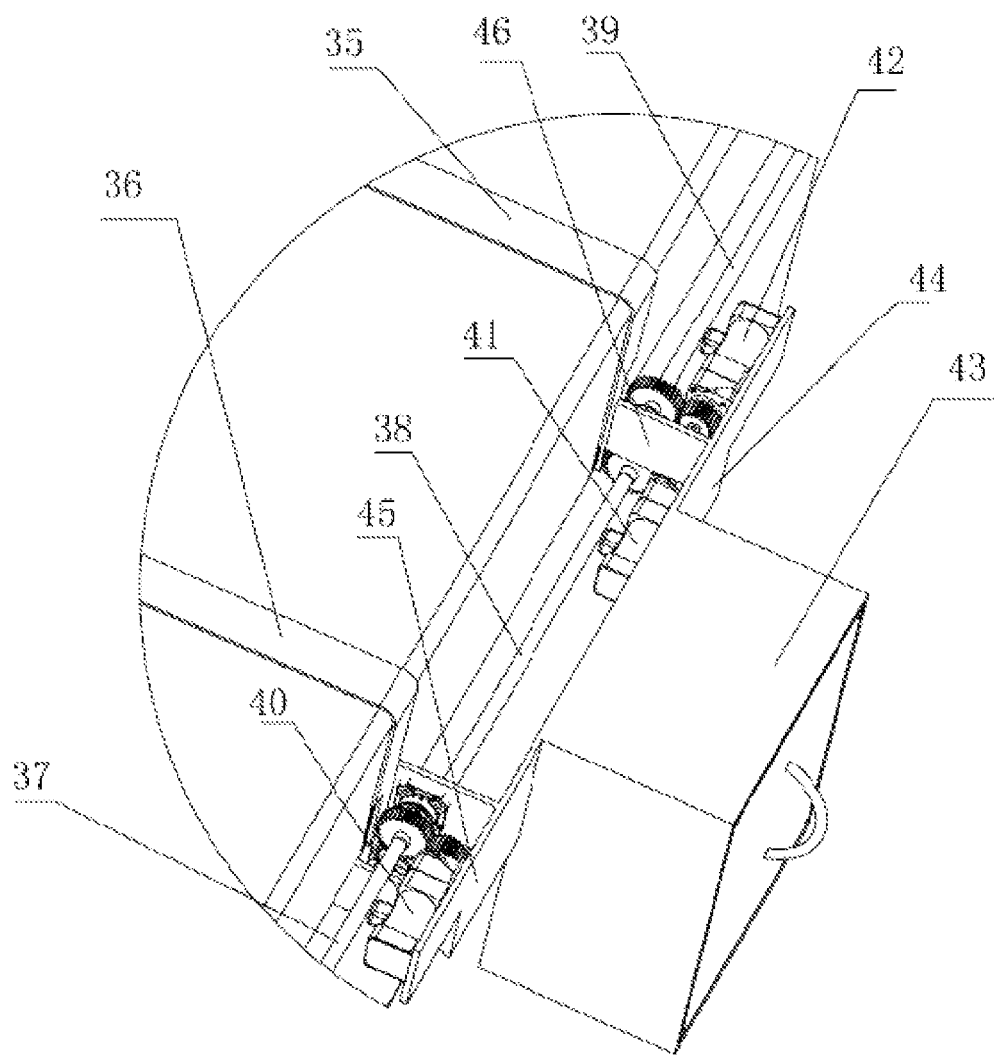
FIG. 13 is an enlarged view of an arrangement structure of a transmission shaft and a motor in FIG. 2.
Figure 15:
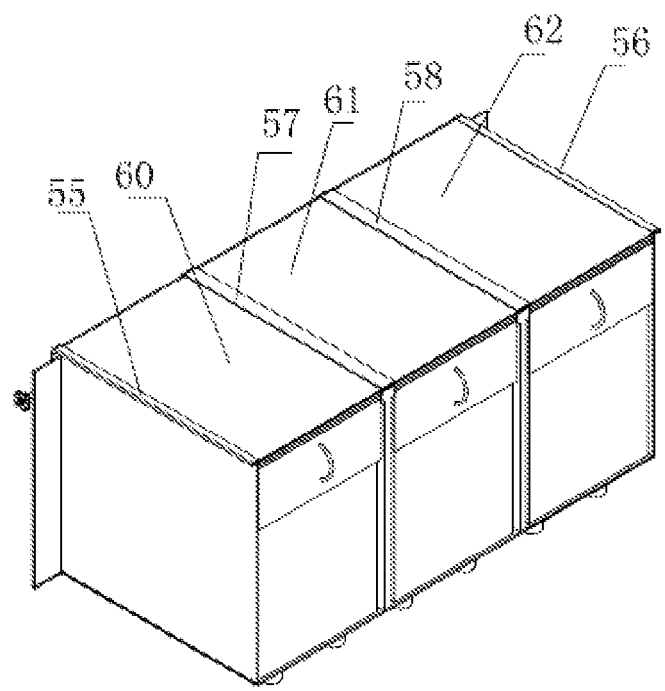
FIG. 15 is a structural schematic diagram of an intelligent lunch box of the present invention provided with three containers, three cover plates and three trays.
Figure 16:
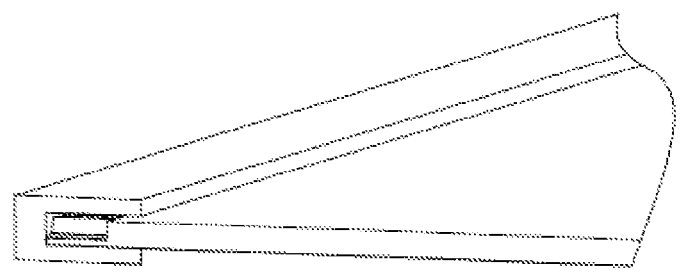
FIG. 16 is a partial schematic diagram as the edge of a cover plate is placed in a chute.

Refer to FIG. 15, the difference between the intelligent lunch box shown in FIG. 15 and that shown in FIG. 14 is that each container in the intelligent lunch box is provided with its independent cover plate which is correspondingly provided with its motor and transmission shaft; the motors and the transmission shafts are arranged in the structure similar to those shown in FIGS. 11 and 12 (even totally in the same structure in which three independent cover plates are adopted); the baffle chutes 57 and 58 provided with the openings at the left sides and the right sides and extending longitudinally are arranged above the baffles; the baffle chutes and the left chute 55 or right chute 56 (the left chute or right chute refers to the chute at the left end or right end of the intelligent lunch box) are in the same horizontal plane; the cover plates 60, 61 and 62 are respectively arranged between the left side wall 59 of the container bracket and the baffle 57 adjacent thereto, between the two adjacent baffles 57 and 58, and between the right side wall of the container bracket and the baffle 58 adjacent thereto; the left edge and right edge of the cover plate 60 are arranged in the left chute 55 and baffle chute 57 respectively; the left edge and right edge of the cover plate 61 are arranged in the baffle chutes 57 and 58 respectively; the left edge and right edge of the cover plate 62 are arranged in the right chute 56 and baffle chute 58 respectively; from this, the intelligent lunch box of the example is provided with three container brackets; one container can be placed in each container bracket; each container bracket is provided with one independent tray and one independent cover plate.

In the above two embodiments, the left chute and right chute can be arranged on the internal surfaces of the left longitudinal part and the right longitudinal part of the top surface of the housing respectively; the baffle chutes are arranged on the internal surface of the forward extending part of the top surface of the housing; the forward extending part is arranged over the baffle chutes, and extends forward from the transverse part to the front ends of the baffle chutes, or the left chute and right chute can be fixed at the tops of the left side wall and right side wall of the container bracket, respectively; the baffle chutes are fixed at the tops of the baffles.

It is worth noting that the cover plate in the present invention should be flexible enough to deform adaptively with the change in the motion track; for example, when the cover plate of the present invention is opened, its rear end deforms at the top of the rear side wall of the container bracket and bends downwards; therefore, the cover plate can move downwards along the rear side wall of the container bracket to be opened smoothly.

When having meals with the intelligent lunch box of the present invention, a user inputs his/her age, gender, height, weight, pathological and physiological parameters and the like by the touch display; when food (meat, vegetables, fruits, staple food, soup and the like) is put into in the containers of the lunch box, the weight sensors send the measurement data of the food to the CPU which records and analyzes whether the food in the containers is suitable for the user to take according to the input age, gender, height, weight and pathological and physiological parameters of the user, together with the memory having the diet database, and the time, provides a healthy diet dietary suitable for the user according to the historic records and analytical results, and controls the opening, closing or half-opening of the containers to allow or not to allow the user to take the food, or allow the user to take certain food, thereby achieving the purposes of controlling the categories and amount of the food taken. It should be worth noting that the diet database in the present invention provides the weights, categories, proportions of the rice, vegetables and soup and other healthy diet dietary information in the dining process according to the human nutriology and combining with the individual gender, age, height, weight, physical condition, physiological and pathological parameters and food taking time, thereby helping the user to realize and control his/her diet in real time and achieving the purpose of healthy diet. In conclusion, the intelligent lunch box of the present invention can directly collocate the nutritive meals, directly control the diet methods, diet amount and diet structures of the people, and therefore improve the nutritive structure and achieve the purposes of allowing the user to loose or gain weight and improve health.

What is claimed is:

1. An intelligent lunch box, mainly comprising a start button, containers with open tops for containing food, a movable cover plate for controlling the opening and closing of the containers, a motor for controlling the opening and closing of the cover plate, a controller for controlling the running of the motor, a memory having a diet database, a touch display, and weight sensors for sending the weights of the containers to the controller; wherein the start button is electrically connected with the controller, the memory, the motor and the touch display, respectively; the controller is electrically connected with the memory, the motor, the weight sensors and the touch display, respectively; the controller is a single-chip computer or a CPU;

wherein, the intelligent lunch box further comprises a container bracket for accommodating the containers, a left chute and a right chute that have a groove at the inner sides are arranged at the top of a left side wall and a side wall of the container bracket respectively, and a left edge and a right edge of the cover plate are movably arranged in the left chute and right chute respectively via the grooves;

wherein a rear end of the cover plate extends to rear side wall of the container bracket, and when the cover plate is fully opened, the cover plate is capable of being entirely disposed in the vicinity of the rear side wall of the container bracket.

2. The intelligent lunch box of claim 1, wherein racks or a plurality of sequentially adjacent open pores are longitudinally arranged at the left and right ends of the cover plate; an output shaft of the motor is provided with a motor gear; a transmission shaft extending transversely is arranged on the rear side faces of the containers; a transmission shaft gear is arranged at the transmission shaft, corresponding to the racks, the motor gear is engaged with the transmission shaft gear, and the transmission shaft gear is engaged with the racks or the open pores.

3. The intelligent lunch box of claim 2, wherein the container bracket comprises a bottom plate at the bottom, and a front side wall, a rear side wall, a left side wall and a right side wall that are arranged at the four edges of the upper surface of the bottom plate and extend upwards; the four edges of the top of the containers extend outwards to form outer edges; when the containers are placed in the container bracket, the outer edges are fittedly lapped at the top of the container bracket; the rear end of the cover plate extends to the rear side wall of the container bracket and extends downwards to a place to allow the racks or open pores to be engaged with the transmission shaft gear; the transmission shaft is arranged behind the rear side wall of the container bracket.

4. The intelligent lunch box of claim 3, wherein the weight sensors are arranged on the bottom plate, and are in contact with the bottoms of the containers when the containers are placed in the container bracket.

5. The intelligent lunch box of claim 4, wherein the distances from the inner sides of the left chute and right chute to the inner sides of the left side wall and right side wall of the container bracket are equal to or larger than the widths of the outer edges of the containers.

6. The intelligent lunch box of claim 5, wherein at least three containers are adopted and sequentially placed in the container bracket from left to right.

7. The intelligent lunch box of claim 6, wherein trays are arranged between the left side wall and right side wall of the container bracket; tray holes large enough for the containers to pass through are arranged in the trays, corresponding to the containers; stop blocks are arranged at the upper parts of the internal surfaces of the left side wall and right side wall of the container bracket; left plate walls and right plate walls of the trays are placed on the stop blocks; rear plate walls of the tray are placed on the rear side wall of the container bracket; handles are arranged on the external surface of a front plate wall of the trays.

8. The intelligent lunch box of claim 7, wherein the baffles are arranged between the adjacent containers; the bottoms of the baffles are fixedly connected with the bottom plate of the container bracket; the heights of the baffle are the same as the height of the left side wall or right side wall of the container bracket; the front and rear ends of the baffles are fixedly connected with the front and rear side walls of the container bracket.

9. The intelligent lunch box of claim 8, wherein baffle chutes provided with openings at the left sides and the right sides and extending longitudinally are arranged above the baffles; the baffle chutes and the left chute or right chute are in the same horizontal plane; a cover plate is arranged between the left side wall of the container bracket and the baffle adjacent thereto, between the two adjacent baffles and between the right side wall of the container bracket and the baffle adjacent thereto;

the left edge and right edge of the cover plate between the left side wall and the baffle adjacent thereto are arranged in the left chute and the baffle chutes respectively; the left edge and right edge of the cover plate between the two adjacent baffles are arranged in the two baffle chutes respectively; the left edge and right edge of the cover plate between the right side wall of the container bracket and the baffle adjacent thereto are arranged in the right chute and the baffle chutes respectively;

a transmission shaft and a motor are adopted corresponding to each cover plate;

chute holes allowing the baffle chutes to penetrate through are arranged in the trays, corresponding to the baffle chutes.

10. The intelligent lunch box of claim 5, wherein at least three containers are adopted and sequentially placed in the container bracket from left to right; the baffles are arranged between the adjacent containers; the bottoms of the baffles are fixedly connected with the bottom plate of the container bracket; the heights of the baffles are the same as the height of the left side wall or right side wall of the container bracket; the front ends and rear ends of the baffles are fixedly connected with the front and rear side walls of the container bracket;

the trays are arranged between the left side wall of the container bracket and the baffle adjacent thereto, between the two adjacent baffles, and between the right side wall of the container bracket and the baffle adjacent thereto; the tray holes large enough for the containers to pass through are arranged in the trays, corresponding to the containers; the stop blocks are arranged at the upper parts of the internal surfaces of the left side wall and right side wall of the container bracket, and at the upper parts of the left side faces and right side faces of the baffles; the left plate walls and the right plate walls of the trays are placed on the stop blocks; the rear plate walls of the trays are placed on the rear side wall of the container bracket; the handles are arranged on the external surfaces of the front plate walls of the trays.

11. The intelligent lunch box of claim 10, wherein baffle chutes provided with openings at the left sides and the right sides and extending longitudinally are arranged above the baffles; the baffle chutes and the left chute or right chute are in the same horizontal plane; the cover plates are arranged between the left side wall of the container bracket and the baffle adjacent thereto, between the two adjacent baffles, and between the right side wall of the container bracket and the baffle adjacent thereto;

the left side wall of the container bracket as well as the left edge and right edge of the cover plate of the baffle adjacent thereto are arranged in the left chute and the baffle chutes; the left edge and right edge of the cover plate between the two adjacent baffles are arranged in the two adjacent baffle chutes respectively; the right side wall of the container bracket as well as the left edge and right edge of the cover plate between the baffle adjacent thereto are arranged in the right chute and the baffle chutes;

a transmission shaft and a motor are adopted corresponding to each cover plate.

12. The intelligent lunch box of claim 9, further comprising a housing arranged outside the container bracket, wherein a left side plate and a right side plate of the housing are connected with outer edges of the left end and right end of the rear side wall of the container bracket respectively; a rear panel of the housing is arranged behind the motor; the top surface and the front panel of the housing are in a U shape; a transverse part of the top surface of the housing is fixedly connected with the top end of a rear panel of the housing; the outer edges of a left longitudinal part and a right longitudinal part of the top surface of the housing are fixedly connected with the top ends of the left side plate and the right side plate of the housing respectively; the inner edges of the left longitudinal part and the right longitudinal part of the top surface of the housing are fixedly connected with the left side wall and the right side wall of the container bracket respectively;

the bottom end of the transverse part of the front panel is fixedly connected with the front end of the bottom surface of the housing; the upper end of the transverse part is fixedly connected with the front side wall of the container bracket, and is lower than the lower edges of the trays; the outer edges of a left vertical part and a right vertical part of the front panel are fixedly connected with the front ends of the left side plate and the right side plate respectively; the tops of the left vertical part and right vertical part are fixedly connected with the front ends of the left longitudinal part and the right longitudinal part of the top surface respectively; the inner sides of the left vertical part and the right vertical part are fixedly connected with extending parts of the tops of the left side wall and the right side wall of the container bracket;

the touch display and the start button are arranged at the transverse part of the top surface; the transverse part is also provided with a loudspeaker which is electrically connected with the controller; at least three cavities are longitudinally arranged in at least one container;

a temperature sensor for monitoring the temperature of the containers is arranged on the internal wall of the container bracket;

the controller and the memory are fixed on the external surface of the rear side wall of the container bracket, or fixed on the internal surface of the rear panel of the housing, or fixed on the internal surface of the transverse part at the top of the housing;

a battery case is arranged on the rear panel of the housing; a motor mounting plate for mounting the motor is arranged on the inner panel of the battery case; a left fixing plate and a right fixing plate for fixing the transmission shafts are arranged at the left and right sides of the motor mounting plate;

the transmission shafts are sequentially arranged from left to right, wherein the two ends of the transmission shaft at the left are fixed between the rear side wall of the container bracket and the battery case respectively by the bearing support on the right side plate of the housing and the bearing support on the left side face of the left fixing plate, and the motor for driving the transmission shaft is correspondingly arranged at the left end of the motor mounting plate;

the two ends of the transmission shaft at the right are fixed between the rear side wall of the container bracket and the battery case respectively by the bearing support on the left side plate of the housing and the bearing support on the right side face of the right fixing plate, and the motor for driving the transmission shaft is correspondingly arranged at the right end of the motor mounting plate;

the two ends of the transmission shaft in the middle are fixed between the rear side wall of the container bracket and the battery case respectively by the bearing support on the right side face of the left fixing plate and the bearing support on the left side face of the right fixing plate, and the motor for driving the transmission shaft is correspondingly arranged between the two ends of the motor mounting plate;

the left chute and right chute are arranged on the internal surfaces of the left longitudinal part and the right longitudinal part of the top surface of the housing respectively; the baffle chutes are arranged on the internal surface of the forward extending part of the top surface of the housing; the forward extending part is arranged over the baffle chutes, and extends forward from the transverse part to the front ends of the baffle chutes, or the left chute and right chute are fixed at the tops of the left side wall and right side wall of the container bracket respectively; the baffle chutes are fixed at the tops of the baffles.

13. The intelligent lunch box of claim 11, further comprising a housing arranged outside the container bracket, wherein a left side plate and a right side plate of the housing are connected with outer edges of the left end and right end of the rear side wall of the container bracket respectively; a rear panel of the housing is arranged behind the motor; the top surface and the front panel of the housing are in a U shape; a transverse part of the top surface of the housing is fixedly connected with the top end of a rear panel of the housing; the outer edges of a left longitudinal part and a right longitudinal part of the top surface of the housing are fixedly connected with the top ends of the left side plate and the right side plate of the housing respectively; the inner edges of the left longitudinal part and the right longitudinal part of the top surface of the housing are fixedly connected with the left side wall and the right side wall of the container bracket respectively;

the bottom end of the transverse part of the front panel is fixedly connected with the front end of the bottom surface of the housing; the upper end of the transverse part is fixedly connected with the front side wall of the container bracket, and is lower than the lower edges of the trays; the outer edges of a left vertical part and a right vertical part of the front panel are fixedly connected with the front ends of the left side plate and the right side plate respectively; the tops of the left vertical part and right vertical part are fixedly connected with the front ends of the left longitudinal part and the right longitudinal part of the top surface respectively; the inner sides of the left vertical part and the right vertical part are fixedly connected with extending parts of the tops of the left side wall and the right side wall of the container bracket;

the touch display and the start button are arranged at the transverse part of the top surface; the transverse part is also provided with a loudspeaker which is electrically connected with the controller; at least three cavities are longitudinally arranged in at least one container;

a temperature sensor for monitoring the temperature of the containers is arranged on the internal wall of the container bracket;

the controller and the memory are fixed on the external surface of the rear side wall of the container bracket, or fixed on the internal surface of the rear panel of the housing, or fixed on the internal surface of the transverse part at the top of the housing;

a battery case is arranged on the rear panel of the housing; a motor mounting plate for mounting the motor is arranged on the inner panel of the battery case; a left fixing plate and a right fixing plate for fixing the transmission shafts are arranged at the left and right sides of the motor mounting plate;

the transmission shafts are sequentially arranged from left to right, wherein the two ends of the transmission shaft at the left are fixed between the rear side wall of the container bracket and the battery case respectively by the bearing support on the right side plate of the housing and the bearing support on the left side face of the left fixing plate, and the motor for driving the transmission shaft is correspondingly arranged at the left end of the motor mounting plate;

the two ends of the transmission shaft at the right are fixed between the rear side wall of the container bracket and the battery case respectively by the bearing support on the left side plate of the housing and the bearing support on the right side face of the right fixing plate, and the motor for driving the transmission shaft is correspondingly arranged at the right end of the motor mounting plate;

the two ends of the transmission shaft in the middle are fixed between the rear side wall of the container bracket and the battery case respectively by the bearing support on the right side face of the left fixing plate and the bearing support on the left side face of the right fixing plate, and the motor for driving the transmission shaft is correspondingly arranged between the two ends of the motor mounting plate;

the left chute and right chute are arranged on the internal surfaces of the left longitudinal part and the right longitudinal part of the top surface of the housing respectively; the baffle chutes are arranged on the internal surface of the forward extending part of the top surface of the housing; the forward extending part is arranged over the baffle chutes, and extends forward from the transverse part to the front ends of the baffle chutes, or the left chute and right chute are fixed at the tops of the left side wall and right side wall of the container bracket respectively; the baffle chutes are fixed at the tops of the baffles.

14. The intelligent lunch box of claim 1, wherein the cover plate is flexible to deform adaptively when moving along the chutes.

* * * * *